US010770189B2

(12) United States Patent
Morgan et al.

(10) Patent No.: US 10,770,189 B2
(45) Date of Patent: Sep. 8, 2020

(54) MAGNETICALLY-ACTUATED ISOLATED ROD COUPLINGS FOR USE IN A NUCLEAR REACTOR CONTROL ROD DRIVE

(71) Applicant: GE-Hitachi Nuclear Energy Americas LLC, Wilmington, NC (US)

(72) Inventors: Kenneth A. Morgan, Wilmington, NC (US); David L. Major, Wilmington, NC (US); Randy M. Brown, Wilmington, NC (US); Gerald A. Deaver, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 425 days.

(21) Appl. No.: 15/646,117

(22) Filed: Jul. 11, 2017

(65) Prior Publication Data
US 2018/0019028 A1 Jan. 18, 2018

Related U.S. Application Data

(60) Provisional application No. 62/361,625, filed on Jul. 13, 2016, provisional application No. 62/361,604, (Continued)

(51) Int. Cl.
*G21C 7/14* (2006.01)
*G21C 7/12* (2006.01)
*F16B 1/00* (2006.01)

(52) U.S. Cl.
CPC ............... *G21C 7/14* (2013.01); *G21C 7/12* (2013.01); *F16B 2001/0035* (2013.01); *Y02E 30/39* (2013.01)

(58) Field of Classification Search
CPC ..... G21C 7/08; G21C 7/12; G21C 7/14; G21C 9/02
See application file for complete search history.

(56) References Cited

U.S. PATENT DOCUMENTS

| 2,841,026 A | * | 7/1958 | Glass | ...................... F16H 25/20 |
| | | | | 74/89.38 |
| 3,096,111 A | * | 7/1963 | Myhre | ...................... G21C 7/12 |
| | | | | 403/326 |

(Continued)

FOREIGN PATENT DOCUMENTS

| FR | 3 016 075 A1 | 7/2015 |
| GB | 927 522 A | 5/1963 |

OTHER PUBLICATIONS

Yoritsune et al., "In-vessel Type Control Rod Drive Mechanism Using Magnetic Force Latching for a Very Small Reactor," Aug. 2002, J. Nuc. Sci. & Tech., vol. 39, No. 8, pp. 913-922.

(Continued)

*Primary Examiner* — Sharon M Davis
(74) *Attorney, Agent, or Firm* — Ryan Alley IP

(57) ABSTRACT

Control rod drives include linearly-moveable control elements inside an isolation barrier. Control rod drives move the control element through a motor and rotor powering a linear screw internal to an isolation barrier. Induction coils may generate magnetic fields and be moveable across a full stroke length of the control element in the reactor. The magnetic fields hold closed a releasable latch to disconnect the control elements from the linear drives. A control rod assembly may join to the control element. The control rod assembly may lock with magnetic overtravel latches inside the isolation barrier to maintain an overtravel position. Overtravel release coils outside the isolation barrier may release the latches to leave the overtravel position. Operation includes moving the magnetic fields and releasable latch (Continued)

together on opposite sides of an isolation barrier to drive the control element to desired insertion points, including full insertion by gravity following de-energization.

10 Claims, 4 Drawing Sheets

Related U.S. Application Data filed on Jul. 13, 2016, provisional application No. 62/361,628, filed on Jul. 13, 2016.

(56) References Cited

U.S. PATENT DOCUMENTS

| | | | | |
|---|---|---|---|---|
| 3,158,766 | A | * | 11/1964 | Frisch .................... F16H 27/02 |
| | | | | 310/14 |
| 3,853,699 | A | * | 12/1974 | Frisch .................... G21C 7/12 |
| | | | | 376/228 |
| 3,933,581 | A | | 1/1976 | McKeehan et al. |
| 3,941,653 | A | | 3/1976 | Thorp, II |
| 3,992,255 | A | | 11/1976 | DeWesse |
| 4,044,622 | A | | 8/1977 | Matthews |
| 4,048,010 | A | | 9/1977 | Eschenfelder et al. |
| 4,092,213 | A | | 5/1978 | Nishimura |
| 4,147,589 | A | | 4/1979 | Roman et al. |
| 4,288,898 | A | | 9/1981 | Adcock |
| 4,338,159 | A | | 7/1982 | Martin |
| 4,369,161 | A | | 1/1983 | Martin |
| 4,423,002 | A | | 12/1983 | Wiart et al. |
| 4,472,348 | A | | 9/1984 | Desfontaines |
| 4,484,093 | A | | 11/1984 | Smith |
| 4,518,559 | A | | 5/1985 | Fischer et al. |
| 5,276,719 | A | | 1/1994 | Batheja et al. |
| 5,428,873 | A | | 7/1995 | Hitchcock et al. |
| 5,517,536 | A | | 5/1996 | Golberg et al. |
| 5,778,034 | A | | 7/1998 | Tani |
| 8,571,162 | B2 | | 10/2013 | Maruyama et al. |
| 8,757,065 | B2 | | 6/2014 | Fjerstad et al. |
| 8,811,562 | B2 | | 8/2014 | DeSantis |
| 8,915,161 | B2 | | 12/2014 | Akatsuka et al. |
| 9,305,669 | B2 | | 4/2016 | Hyde |
| 9,336,910 | B2 | | 5/2016 | Shargots et al. |
| 2015/0255178 | A1 | | 9/2015 | Tsuchiya et al. |

OTHER PUBLICATIONS

International Invitation to pay additional fees issued in connection with corresponding PCT Application No. PCT/US2017/041808 dated May 4, 2018.

International Search Report and Written Opinion issued in connection with corresponding PCT Application No. PCT/US2017/041808 dated Jul. 5, 2018.

Morgan, K.A., et al., Isolated rod couplings for use in a nuclear reactor control rod drive, GE co-pending U.S. Appl. No. 62/361,625, filed Jul. 13, 2016.

Morgan, K.A., et al., Isolated rod couplings for use in a nuclear reactor control rod drive, GE co-pending U.S. Appl. No. 62/361,628, filed Jul. 13, 2016.

* cited by examiner

MAGNETICALLY-ACTUATED ISOLATED ROD COUPLINGS FOR USE IN A NUCLEAR REACTOR CONTROL ROD DRIVE

RELATED APPLICATIONS

This application claims priority under 35 U.S.C. § 119 to co-pending U.S. Provisional Applications 62/361,604; 62/361,625; 62/361,628, all filed Jul. 13, 2016 and incorporated by reference herein in their entireties.

BACKGROUND

FIG. 1 is an illustration of a drive rod-control rod assembly (CRA) connection 10 useable with example embodiment control drives. In most conventional PWR control rod assemblies, drive rod 11 and actuating rod 12 extend in lateral support tube 16 from above a reactor pressure vessel 1 down to a lockable spud or bayonet 13 that joins to CRA 15 via locking plug 14. CRA 15 contains neutron absorbent materials what can be used to control a nuclear chain reaction based on an amount of vertical insertion. Control rods are driven from above by vertical movement of actuating rod 12 and drive rod 13, under force from the control rod drive mechanism.

The following documents are incorporated herein by reference in their entireties: U.S. Pat Pub 2015/0255178 to Tsuchiya et al; U.S. Pat. No. 4,423,002 to Wiart et al.; U.S. Pat. No. 4,369,161 to Martin; U.S. Pat. No. 4,338,159 to Martin et al.; U.S. Pat. No. 4,044,622 to Matthews; U.S. Pat. No. 9,305,669 to Hyde et al.; U.S. Pat. No. 3,933,581 to McKeehan et al.; U.S. Pat. No. 4,048,010 to Eschenfelder et al.; U.S. Pat. No. 4,092,213 to Nishimura; U.S. Pat. No. 4,147,589 to Roman et al.; U.S. Pat. No. 4,288,898 to Adcock; U.S. Pat. No. 4,484,093 to Smith; U.S. Pat. No. 5,276,719 to Batheja; U.S. Pat. No. 8,915,161 to Akatsuka et al.; U.S. Pat. No. 4,518,559 to Fischer et al.; U.S. Pat. No. 5,517,536 to Goldberg et al.; U.S. Pat. No. 5,428,873 to Hitchcock et al.; U.S. Pat. No. 8,571,162 to Maruyama et al.; U.S. Pat. No. 8,757,065 to Fjerstad et al.; U.S. Pat. No. 5,778,034 to Tani; U.S. Pat. No. 9,336,910 to Shargots et al.; U.S. Pat. No. 3,941,653 to Thorp, II; U.S. Pat. No. 3,992,255 to DeWesse; U.S. Pat. No. 8,811,562 to DeSantis; and "In-vessel Type Control Rod Drive Mechanism Using Magnetic Force Latching for a Very Small Reactor" Yoritsune et al., J. Nuc. Sci. & Tech., Vol. 39, No. 8, p. 913-922 (August 2002).

SUMMARY

Example embodiments include control rod drives including linearly-moveable control elements to control neutronics in a nuclear reactor. Example control rod drives may include an isolation barrier impermeably separating pressurized reactor internals from external spaces like containment as well as providing a vacuum environment for control rod drive elements outside the reactor. One or more induction coils are linearly moveable outside of the isolation barrier, while the control element is inside the isolation barrier in the reactor. Example control rod drives may move the control element via selective coupling between the control element and a motor-driven linear drive. The selective coupling may use a latch with magnetic-selective coupling, such as magnetized plungers that hold the drive and control element together in a first position and release the two in a second position. For example, the plungers may bias against and compress springs under magnetic force, and when the magnetic force, such as from external release coils or magnets, is released, the plungers may be driven back up by the springs and allow a releasing element, such as ball bearings or blocking elements, to slide back where the plunger diameter is now smaller and release the coupling. Otherwise, the plungers and blocking elements may maintain the joining configurations. A closed coolant loop may cool the induction coils, which may otherwise be maintained in a vacuum or other environment distinct from reactor internals in a housing about an end of the reactor. Example embodiment control rod drives may include a control rod assembly that directly joins to the control element. The control rod assembly may lock with magnetic overtravel latches inside the isolation barrier to maintain an overtravel position. Overtravel release coils outside the isolation barrier can release or otherwise move the latches, which may be spring-biased, to adjust the connection between the latches and assembly.

Example methods include applying a magnetic field to hold the latch in the joined configuration inside the isolation barrier. The latch and holding magnetic field on opposite sides of the isolation barrier may be moved by a common motor driving an interior and exterior rotor two which the two are respectively mounted. For example, a linear screws may be independently driven by the rotors to move the latch and magnetic elements at a same vertical position. When the magnetic element is de-energized or removed, the latch may release and the control element may be driven by gravity into a reactor, achieving a scram. Example methods may drive the control rod to an overtravel position, where overtravel latches hold the same, for removal, attachment, and/or other maintenance of the control element from/to/on the control rod assembly. Following desired overtravel actions, the overtravel coils may be energized to release the latches through magnetic materials in the latch biasing them to an open position.

BRIEF DESCRIPTIONS OF THE DRAWINGS

Example embodiments may become more apparent by describing, in detail, the attached drawings, wherein like elements are represented by like reference numerals, which are given by way of illustration only and thus do not limit the terms which they depict.

DETAILED DESCRIPTION

Figure 1:
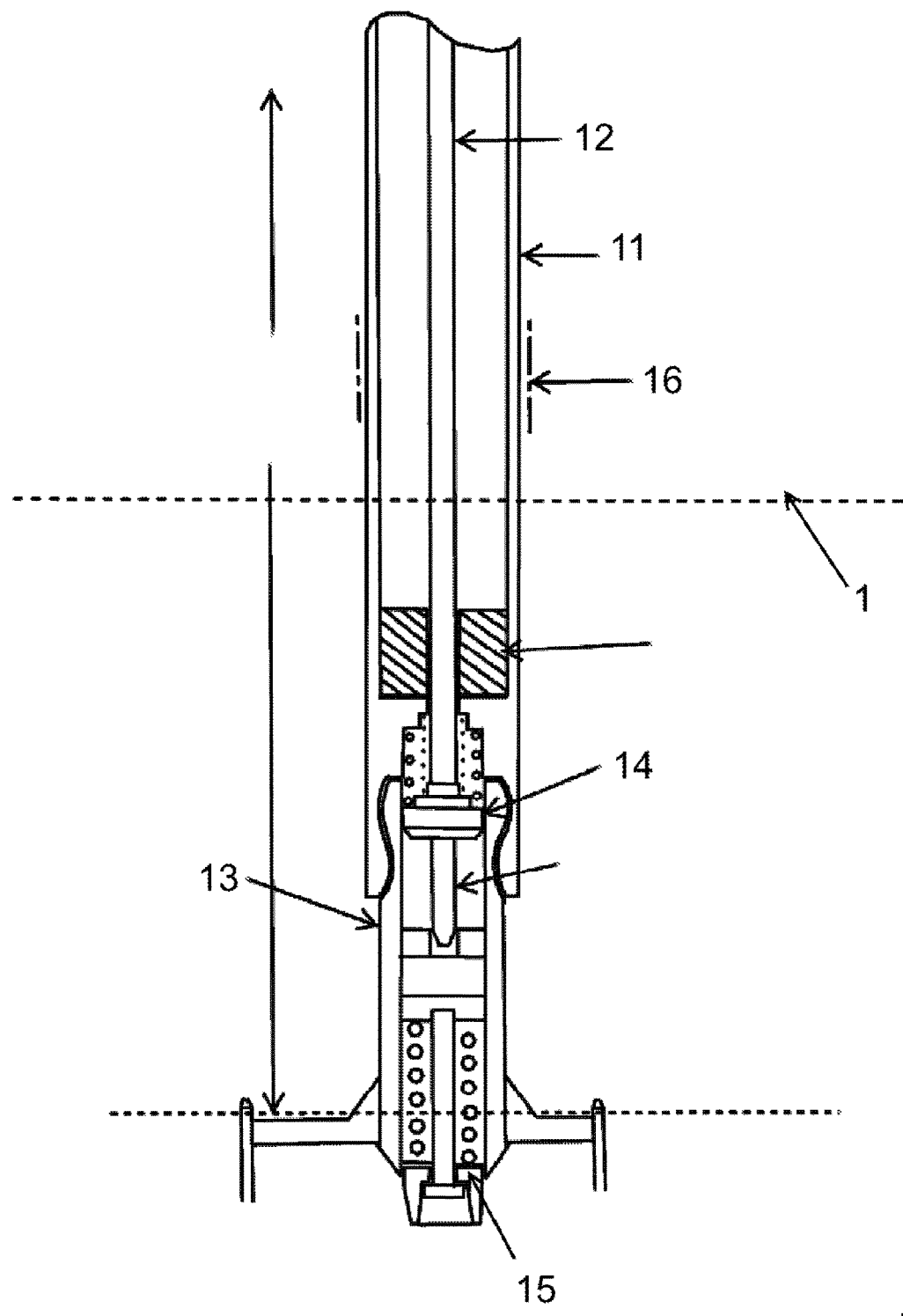
FIG. 1 is an illustration of a drive rod connection to a control rod assembly useable in example embodiments.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It may be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It may be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It may be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The Inventors have newly recognized that control rod drives in nuclear reactors are typically mechanical drives using direct contact points that must pass through or be inside a reactor CRDM pressure boundary 150. Such direct contact and positioning creates a challenging environment for the mechanical drives that typically must operate to move control rods over a period of several months or years without maintenance. For example, reactor temperatures, leaked coolant, and noncondensible gasses found inside example embodiment CRDM 200 pressure boundary 150 can cause corrosion and associated stress corrosion cracking, hydriding, and hydrogen deflagration problems with mechanical drive parts. The cooling mechanisms and heat from direct contact with the drives interact with example embodiment CRDM 200 pressure boundary 150 to also cause thermal cycling problems during actuation of mechanical drives over the course of operation. Penetrations in a control rod drive required for mechanical connection also represent an avenue for leakage of reactor coolant. The Inventors have newly recognized a need for a control rod drive that has less engagement with example embodiment CRDM 200 pressure boundary 150 as well as mechanical contacts that represent high-failure points. Example embodiments described below uniquely enable solutions to these and other problems discovered by the Inventors.

Example Method—Coupling/Decoupling Ball Latch

Figure 2:
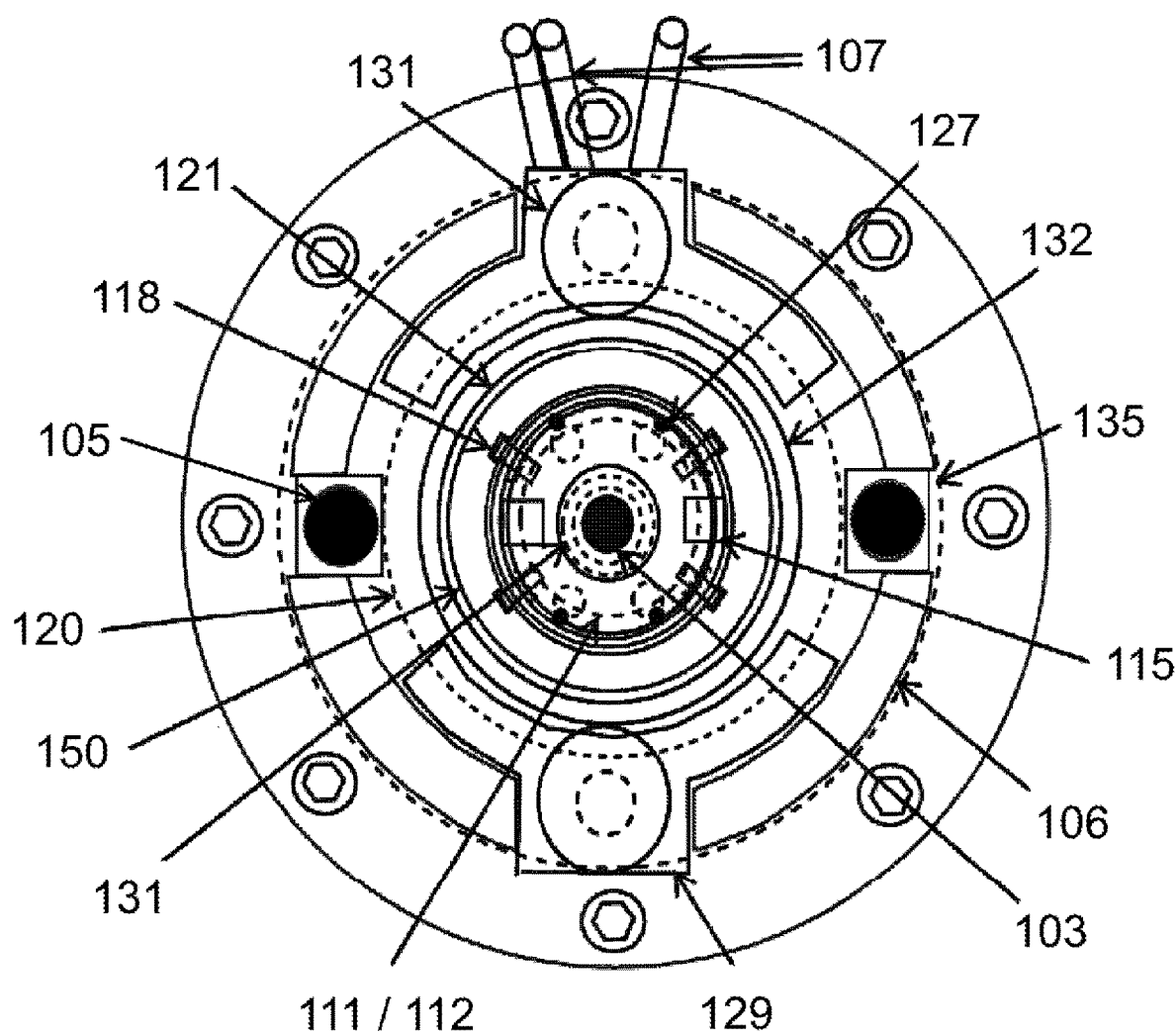
FIG. 2 is a plan illustration of an example embodiment control rod drive mechanism using extended lift coils.
Figure 3:
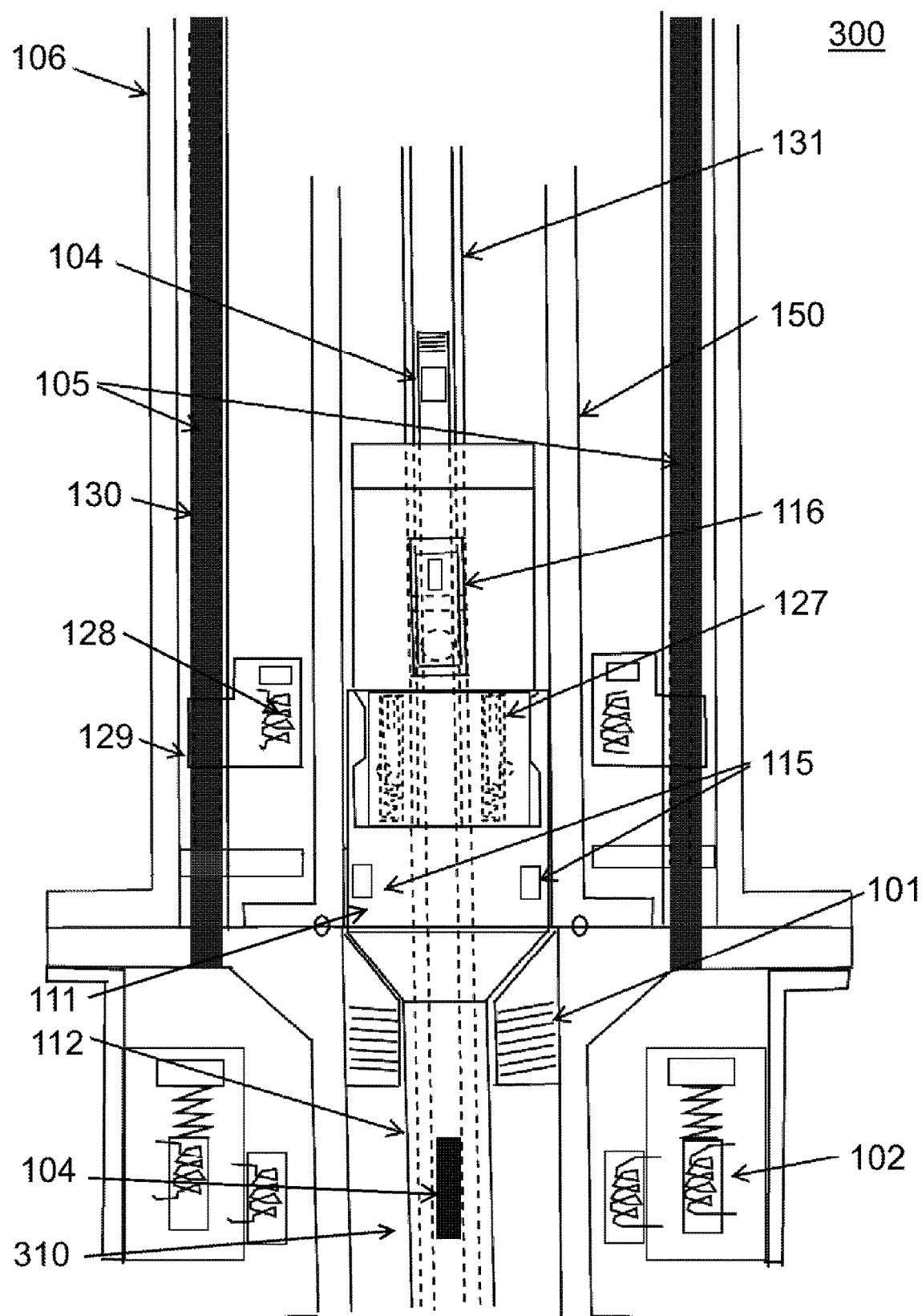
FIG. 3 is a profile illustration of the example embodiment control rod drive mechanism using extended lift coils.
Figure 4:
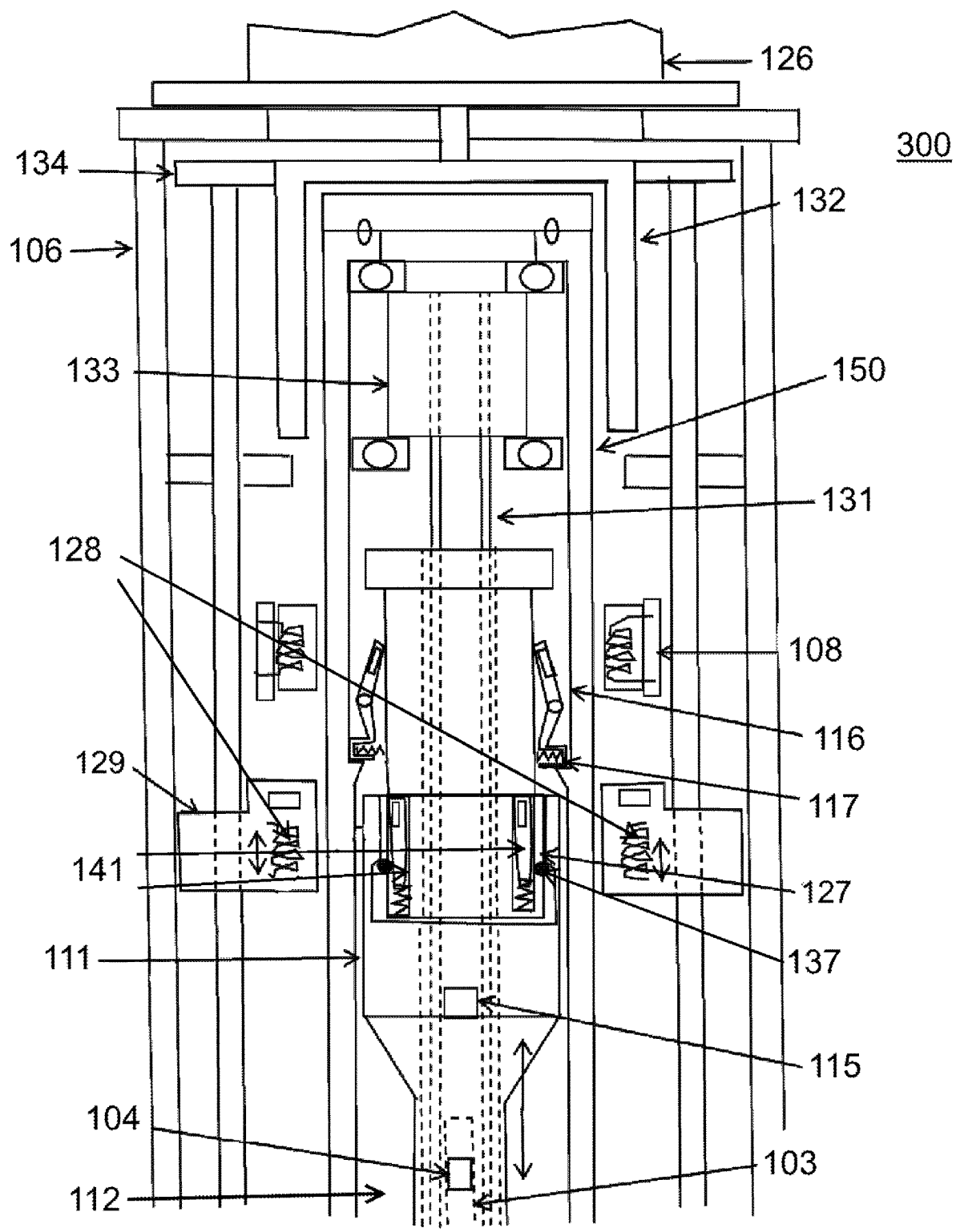
FIG. 4 is another profile illustration of the example embodiment control rod drive mechanism using extended lift coils.

FIG. 2 is a plan view illustration of an example embodiment control rod drive mechanism (CRDM) 300. FIGS. 3 and 4 are profile views of the same example embodiment control rod drive mechanism 300 of FIG. 2, with FIG. 3 showing assembly 310 in a seated position and FIG. 4 showing assembly 310 in an overtravel position. Co-owned application Ser. No. 15/640,428 filed Jun. 30, 2017 to Morgan et al. for "STATIONARY ISOLATED ROD COUPLINGS FOR USE IN A NUCLEAR REACTOR CONTROL ROD DRIVE" and Ser. No. 15/644,908 filed Jul. 10, 2017 to Morgan et al. for "MOVEABLE ISOLATED ROD COUPLINGS FOR USE IN A NUCLEAR REACTOR CONTROL ROD DRIVE" are incorporated herein by reference in their entireties. It is understood that any control rod drive elements from the incorporated applications and provisional applications may be used in any combination with embodiments described herein. Descriptions of position indication magnet 115 and lift rod actuating magnet 104 are given in the incorporated '428 application.

As shown in FIG. 2, a position of nut and ball latch 127 is established by zeroing position sensors 105 at a known position of lift rod 111 and latch 127 such as the overtravel position or the seated position at buffer assembly for scram force 101.

With lift rod 111 sitting in the overtravel position and nut and ball latch 127 nested in its opening, nut and ball latch 127 and coils 128 on exterior linear screw 130 (FIG. 3) are energized. Coils 128 pull down magnetic material in spring-opposed plungers 141, forcing out ball latches 137 so as to engage lift rod 111 shoulders. Lift rod 111 is then coupled to a nut of ball latch 127, and linear hollow screw 131 and outer linear screw 130 (FIG. 9) will drive in concert to maintain a configuration where energized ball latch coils 128 hold ball latch 127 engaged to lift rod 111.

Following a scram, nut and ball latch 127 will follow the scrammed lift rod 111 down to buffer assembly for scram force 101 (FIG. 3) and will drive itself down into the seated lift rod 111. This action resets CRDM 300 for further operation. Ball latch coils 128 may be re-energized before lift rod 111, drive rod 112, and CRA 310 are lifted out of buffer assembly for scram force 101. Lift rod 111 and drive rod 112 may be coupled to nut and ball latch 127 in CRDM 300 prior to coupling with CRA 310 as shown in FIG. 1.

If solenoid actuated release coil 102 fails to release drive rod 112 from CRA 310, an alternative mechanical actuation is available when shutdown. Motor 126, with associated brake and position sensors, and outer rotor 132 may be removed from above CRDM housing 106. The upper flange of CRDM housing 106 may be removed, and a tool may be run down through hollow inner rotor 133 and screw 131. The tool is threaded onto actuating rod 103, allowing it to be pulled while lift rod 111 and drive rod 112 position are held fast. This action compresses the spring(s) above the lower lock plug and frees the spud of CRA 310 from drive rod 112 for maintenance and repairs.

Example Method—Positioning and Scramming the CRDM

As seen in FIG. 3, after lift rod 111 is coupled to ball latch 127 and drive rod 112 is coupled to CRA 310, CRA 310 is positioned by the motor-driven inner linear screw 131. Ball latch coils 128 mounted on outer linear screw 130 remain energized to keep the ball latch nut coupled to lift rod 111 within pressure boundary 150. CRDM motor 126 (FIG. 4) rotates inner rotor 133 (FIG. 4) and screw 131 within CRDM housing 106. The rotation of screw 131 causes vertical movement of ball latch 127 having a nut that is keyed to prevent rotation. Lift rod 111 travels with nut and ball latch 127 as long as balls 137 remain engaged. That is, inner linear screw 131, when rotated by inner rotor 133 inside pressure boundary 150 moves and holds drive rod 112, lift rod 111, and CRA 310 therebelow by rotation and resultant linear movement of those features on threads inside pressure boundary 150.

As seen in FIG. 4, nut and ball latch 127 and outer energized ball latch coils 128 on vertical travelling nut 129 move vertically together on screw(s) 130 traversing the drive range or stroke distance. Feedback from position sensors of motor 126 and position indication probes 105 (FIG. 3) in position indication probe housing 135 (FIG. 3) control rotation of motor 126 and move CRA 310 to its desired position for reactor control. Internal linear screw 131 and external linear screw 130 provide fine motion control of internal lift rod 111, drive rod 112, and CRA 310.

Vacuum gap 121 (FIG. 2) between pressure boundary 150 and the ball latch coils 128 limits heat transfer between coils 128 and pressure boundary 150. This provides a more uniform temperature gradient on pressure boundary 150 that minimizes thermal cycling. Pressure boundary 150 wall thickness can be enhanced to minimize effects of corrosion, hydriding, and hydrogen deflagration problems.

Reactor safety features requiring a scram provide inputs to the control system for the ball latch coils, normally energized to magnetically pair with magnetic elements. If reactor conditions warrant a scram, the control system de-energizes ball latch coils 128. This drops the ball latch magnetic field allowing spring-opposed plungers 141 to raise and retract the balls 137 supporting lift rod 111 shoulders. Gravitational force acts on lift rod 111, drive rod 112, and CRA 310, collapsing nut and ball latches 127 and dropping the unsupported components into a seated position on buffer assembly for scram force 101 (FIG. 3). Any failure causing a loss of current to ball latch coil 128 may also lead to a conservative control rod scram.

As shown in FIG. 2, guide rollers or key features 118 on a head interface of ball latch 127 and lift rod 111 with pressure boundary 150 prevent rotation of ball latch 127, lift rod 111, drive rod 112, and CRA 310 during operation. Ball latch coils 128 may be continuously energized during operation and may be cooled by coolant inlet/outlet 107 through their travel range. Flexible lines of coolant inlet/outlet 107 may be oriented from the top of CRDM 300 and reach ball latch coils 128 through slotted openings of CRDM structural housing 106. These lines along with latch coil control circuits can have counter weights or spring reel feeds to keep them under slight tension during drive operation.

Example Method—CRDM Preparation for Refueling Process

As shown in FIG. 4, drive rod 112 may be decoupled from CRA 310 as described above using solenoid actuated release coil 102 (FIG. 3). For refueling, motor 126, linear screw(s) 131, and ball latch 127 are used to maneuver the coupled lift rod 111 and drive rod 112 to the overtravel position. In the overtravel position, two spring actuated overtravel latches 116 engage a shoulder or window in CRDM housing 106 to lock CRDM 300 at the overtravel height. Power and cooling can then be disconnected from or secured to motor 126 and ball latch coils 128 for a duration of the refueling process. The lower end of drive rod 112 may be carried to an elevation that is clear of the upper to lower vessel disassembly process.

When refueling is completed, motor 126 and ball latch coils 128 may be energized to carry the weight of lift rod 111 and drive rod 112 in the overtravel position. Overtravel release coils 108 are then energized to compress spring actuated structural support 117 resting on pressure boundary 150 structural support as discussed above.

CRDM Support Structure

As shown in FIG. 2, CRDM Pressure Boundary 150 is supported vertically off of CRDM nozzle pressure boundary flange 120 in CRDM structural housing 106 of the RPV flange. Lateral support to upper portions of CRDM pressure boundary 150 may be provided by the close proximity of outer rotor 132 across vacuum gap 121. Inner rotor 133 (FIG. 4), inner linear screw 131, ball lath 127, and lift rod 111 may be laterally supported off walls of CRDM pressure boundary 150.

CRDM structural housing 106 is also fixed to the CRDM nozzle pressure boundary flange 120. Insulating washers and other items can be utilized to reduce the thermal heat transfer from the RPV head to components in CRDM 300. The internal bearings/bushings of outer linear screw(s) 130 (FIG. 3) are supported off CRDM structural housing 106 and not pressure boundary 150 to avoid heat conduction. PIP probes 105 are inserted vertically through the upper flange of CRDM structural housing 106 and are laterally supported at a minimum of the upper and lower ends of CRDM structural housing 106. Motor 126 (FIG. 4) and associated brake and position sensors are mounted on the top end of CRDM structural housing 106 and engage outer rotor 132 and linear screw(s) 131 (FIG. 4) for ball latch coils 128 through drive gear train 134 (FIG. 4). Coolant inlet/outlet lines 107 are run to the fixed motor 126 which is located as remote as possible from the reactor's thermal and radiation output. Motor 126 is also isolated from CRDM pressure boundary 150 by vacuum gap 121 to prevent conduction.

Example embodiments and methods thus being described, it may be appreciated by one skilled in the art that example embodiments may be varied and substituted through routine experimentation while still falling within the scope of the following claims. For example, a generally vertical orientation with control rod drives above a pressure vessel is shown in connection with some examples; however, other configurations and locations of control rods and control rod drives, are compatible with example embodiments and methods simply through proper dimensioning and placement—and fall within the scope of the claims. Such variations are not to be regarded as departure from the scope of these claims.

What is claimed is:

1. A control rod drive for positioning a control element in a nuclear reactor, the drive comprising:
    a control element;
    a linear drive;
    a releasable latch between the control element and linear drive, wherein the releasable latch secures the control element with the linear drive when subject to a magnetic field and releases the control element from the linear drive when not subject to the magnetic field; and
    an induction coil or magnetic material selectively generating the magnetic field, wherein the induction coil or magnetic material is configured to move in unison with the releasable latch across a stroke distance of the control element.

2. The control rod drive of claim 1, further comprising:
an isolation barrier impermeable to gasses and fluids, wherein the releasable latch is inside the isolation barrier and the coil or magnetic material is outside the isolation barrier.

3. The control rod drive of claim 1, further comprising:
a housing containing the linear drive, releasable latch, and the induction coil or magnetic material.

4. The control rod drive of claim 1, further comprising:
a plurality of magnetic overtravel latches inside the isolation barrier configured to hold the control element in an overtravel position; and
a plurality of overtravel release coils outside the isolation barrier configured to move the overtravel latches into a release position.

5. The control rod drive of claim 4, wherein each of the magnetic overtravel latches includes a spring biasing the overtravel latch into a holding position, and wherein the overtravel release coils are configured to bias compress the spring through magnetic force.

6. A control rod drive for positioning a control element in a nuclear reactor, the drive comprising:
a control element;
a linear drive;
a releasable latch between the control element and linear drive, wherein the releasable latch secures the control element with the linear drive when subject to a magnetic field and releases the control element from the linear drive when not subject to the magnetic field;
an induction coil or magnetic material selectively generating the magnetic field; and
an outer linear screw, wherein the induction coil or magnetic material is mounted on the outer linear screw so as to vertically move with rotation of the outer linear screw.

7. The control rod drive of claim 6, wherein the linear drive includes an inner linear screw, wherein the releasable latch is mounted on the inner linear screw so as to vertically move with rotation of the inner linear screw.

8. The control rod drive of claim 7, wherein the linear drive further includes a motor and inner rotor configured to rotate the inner linear screw, and wherein the motor is further connected with an outer rotor configured to rotate the outer linear screw so as to synchronously move the releasable latch and the induction coil or magnetic material on opposite sides of the isolation barrier.

9. A control rod drive for positioning a control element in a nuclear reactor, the drive comprising:
a control element;
a linear drive;
a releasable latch between the control element and linear drive, wherein the releasable latch secures the control element with the linear drive when subject to a magnetic field and releases the control element from the linear drive when not subject to the magnetic field, wherein the releasable latch includes,
a plurality of magnetized plungers each having a variable diameter,
a plurality of springs each coupled to one of the plungers so as to drive the plungers opposite the magnetic field, and
a plurality of balls joining the control element and linear drive, wherein each ball is biased against the one of the magnetized plungers such that the variable diameter moves the ball into and out of a joining configuration based on linear movement of the plungers; and
an induction coil or magnetic material selectively generating the magnetic field.

10. The control rod drive of claim 9, wherein the plungers compress the springs when subject to the magnetic field, and wherein the balls maintain a joining configuration when the plungers are subject to the magnetic field.

* * * * *